United States Patent [19]
Medley, Jr.

[11] Patent Number: 6,094,833
[45] Date of Patent: Aug. 1, 2000

[54] TAPE BLADE LEVEL

[76] Inventor: Travis D. Medley, Jr., 1551 Brenner Way, San Jose, Calif. 95118

[21] Appl. No.: 09/075,496

[22] Filed: May 8, 1998

[51] Int. Cl.$^7$ .................................. G01B 3/10; G01C 9/28
[52] U.S. Cl. ................................... 33/770; 33/369; 33/373
[58] Field of Search ............................ 33/347, 369, 370, 33/371, 373, 759, 760, 768, 770

[56] References Cited

U.S. PATENT DOCUMENTS

| | | | |
|---|---|---|---|
| 360,247 | 3/1887 | Reichenbach | 33/369 |
| 2,386,833 | 10/1945 | Baldwin | 33/369 |
| 2,591,333 | 4/1952 | Bellmer | 33/770 |
| 2,807,887 | 10/1957 | Webb | 33/369 |
| 3,383,772 | 5/1968 | Gardner et al. | 33/373 |
| 4,295,279 | 10/1981 | Sienknecht | 33/373 |
| 5,172,486 | 12/1992 | Waldherr | 33/770 |
| 5,421,100 | 6/1995 | Leore | 33/759 |

*Primary Examiner*—G. Bradley Bennett
*Attorney, Agent, or Firm*—The Kline Law Firm

[57] ABSTRACT

A tape blade level that includes a housing that has an attaching means that secures the level to a tape measure blade. The attaching means includes an arcuate opening that conforms in shape to a typical tape measure blade. The opening is constructed in such a manner that the device can also be readily affixed to a string line. The housing allows the level vial bubble to be viewed from both the front and the rear of the level.

17 Claims, 5 Drawing Sheets

TAPE BLADE LEVEL

FIELD OF THE INVENTION

The present invention relates generally to construction equipment, and more particularly is a level adapted to fit on a tape measure blade or a line.

BACKGROUND OF THE INVENTION

One very important factor in many kinds of construction is being able to determine where a straight, level line lies. For jobs other than those of very short length, this generally entails securing a line and then using a level to true the line. Because it is difficult to check a line for level with a conventional level without altering the position of the line, there have been several products in the prior art that address a level device that can be affixed to a line.

One example of a device that can be affixed directly to a line is the "Line Level" of Streeter, U.S. Pat. No. 4,068,386, issued Jan. 17, 1978. This device includes a level vial encased in a housing with hook and stop members at each end of the housing. The hook members are used to secure the device to the line, and the stop members prevent the line from slipping out of the hooks.

Another reference disclosing a level device that is adapted to be affixed to a line is the "Line Level" of Dufour, U.S. Pat. No. 5,659,967, issued Aug. 26, 1997. The Dufour device is similar in construction to that of the Streeter device, but the Dufour device discloses a different construction of the housing that holds the level vial, and of the hooking elements.

The devices described above free the contractors' hands while they are using the line with a level. While that is a significant advantage, a contractor will often need to measure at the same time as he is deploying a level line. For jobs that require continuous measurement, deploying both the line with a level and a tape measure is repetitive and time wasting. However, there is no device in the prior art that provides a means to simultaneously measure and check the level of a line.

Accordingly, it is an object of the present invention to provide a device that houses a level vial and that is adapted to be affixed to a blade of a tape measure.

It is a further object of the present invention to provide a device that can be affixed to both a tape measure blade and a line.

SUMMARY OF THE INVENTION

The present invention is a tape blade level. The level includes a housing that has an attaching means that secures the level to a tape measure blade. The attaching means includes an arcuate opening that conforms in shape to a typical tape measure blade. The opening is constructed in such a manner that the device can also be readily affixed to a string line. The housing allows the level vial bubble to be viewed from both the front and the rear of the level.

An advantage of the present invention is that it can be deployed on a tape measure blade to allow the user to check level while measuring the workpiece or work location.

Another advantage of the present invention is that it can be used with both a tape measure and a string line.

A still further advantage of the present invention is that it costs no more to manufacture than the typical line level, but is far more versatile in its possible uses.

Still another advantage of the present invention is that it allows a user to reduce the number of tools required for jobs requiring level lines.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
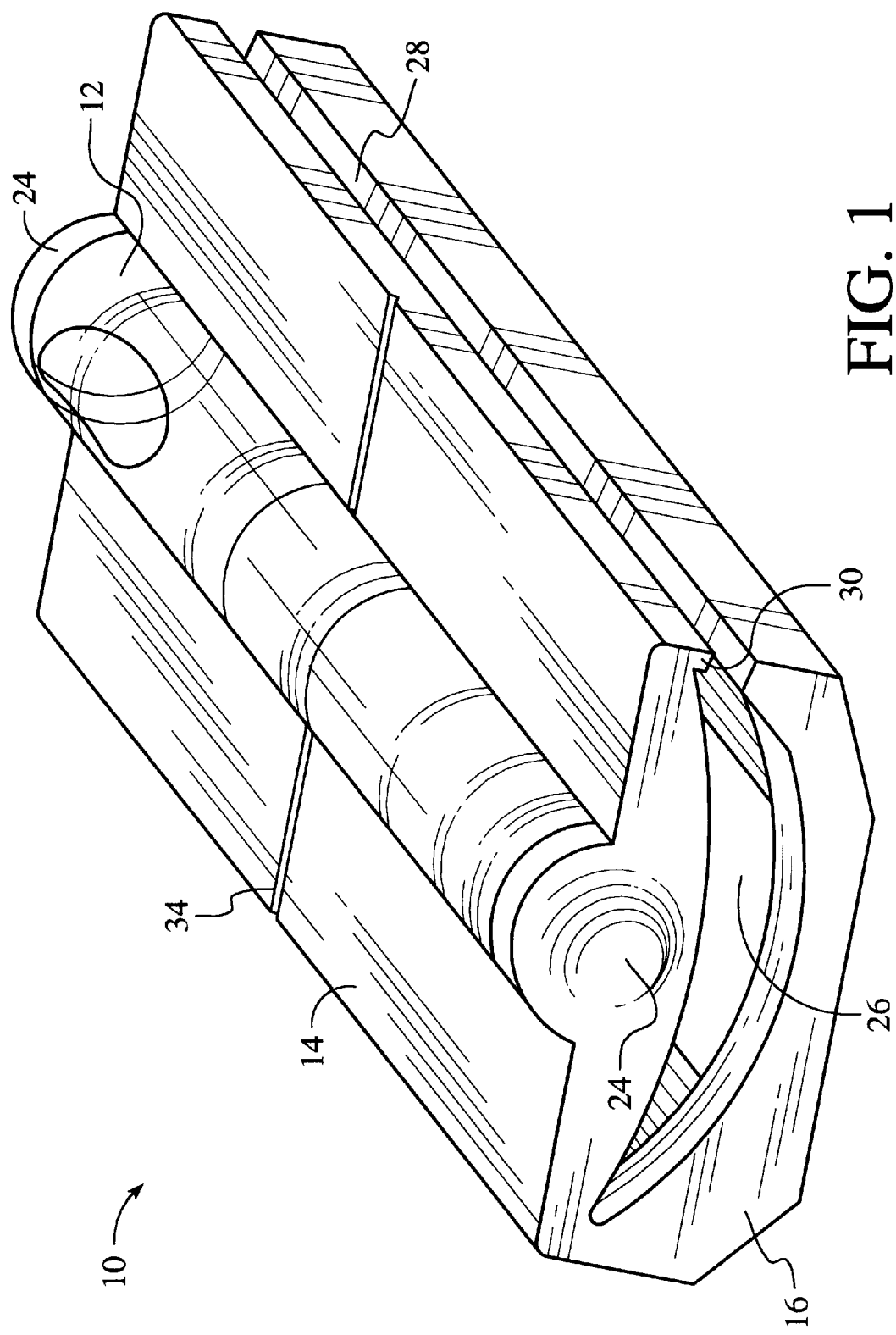
FIG. 1 is a perspective view of the tape blade level of the present invention.
Figure 2:
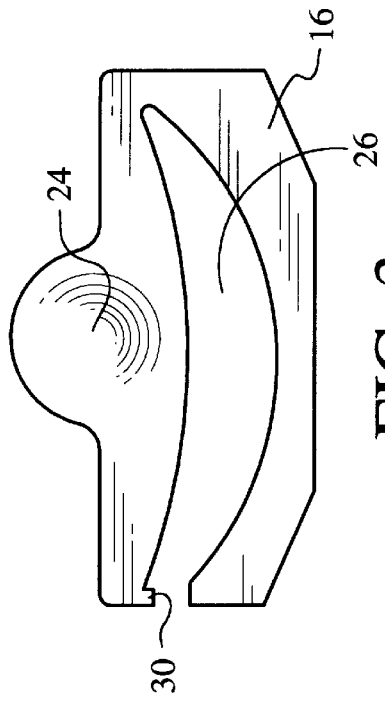
FIG. 2 is a left end view of the level.
Figure 3:
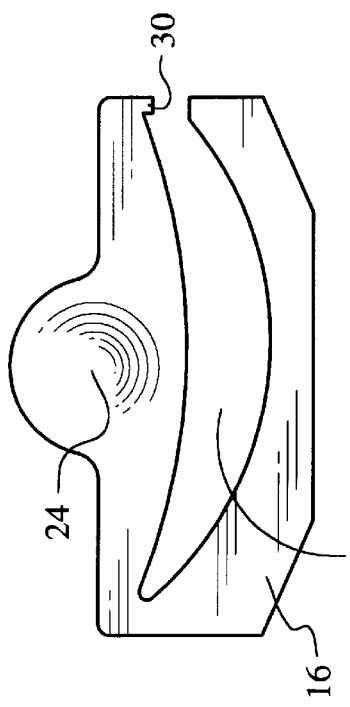
FIG. 3 is a right end view of the level.
Figure 4:
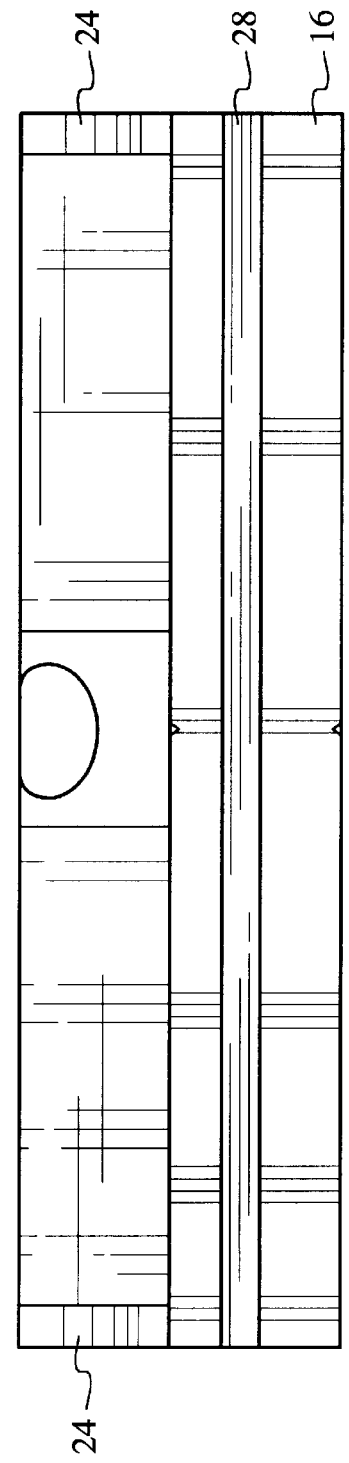
FIG. 4 is a lower side view of the level.
Figure 5:
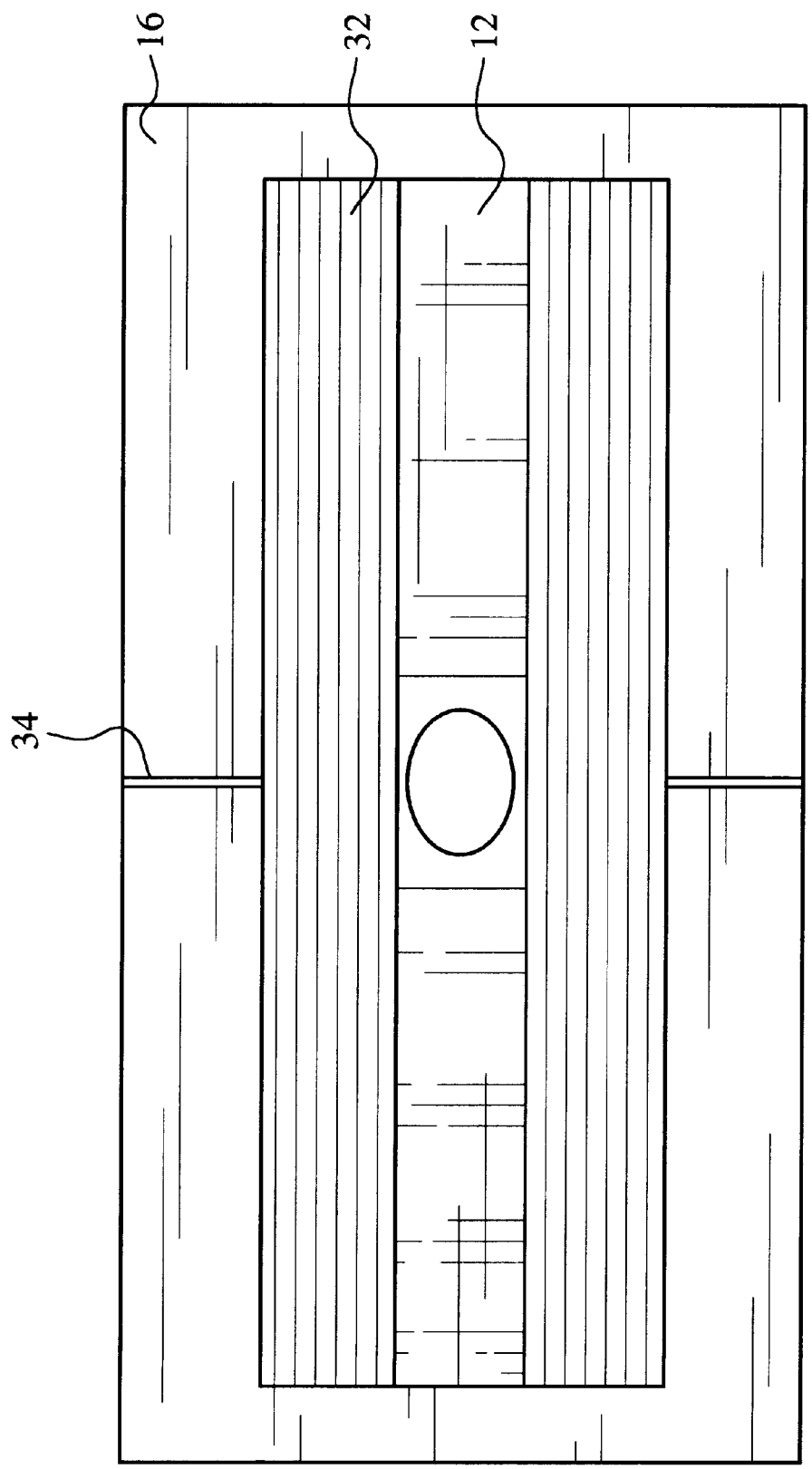
FIG. 5 is a rear view of the level device.

The present invention is a tape blade level 10. The tape blade level 10 includes a level vial 12 contained in a housing 14. The housing 14 includes an attaching means 16 that allows the level 10 to be fit onto a tape measure blade 18. The attaching means 16 also allows the level 10 to be affixed to a line.

Figure 6:
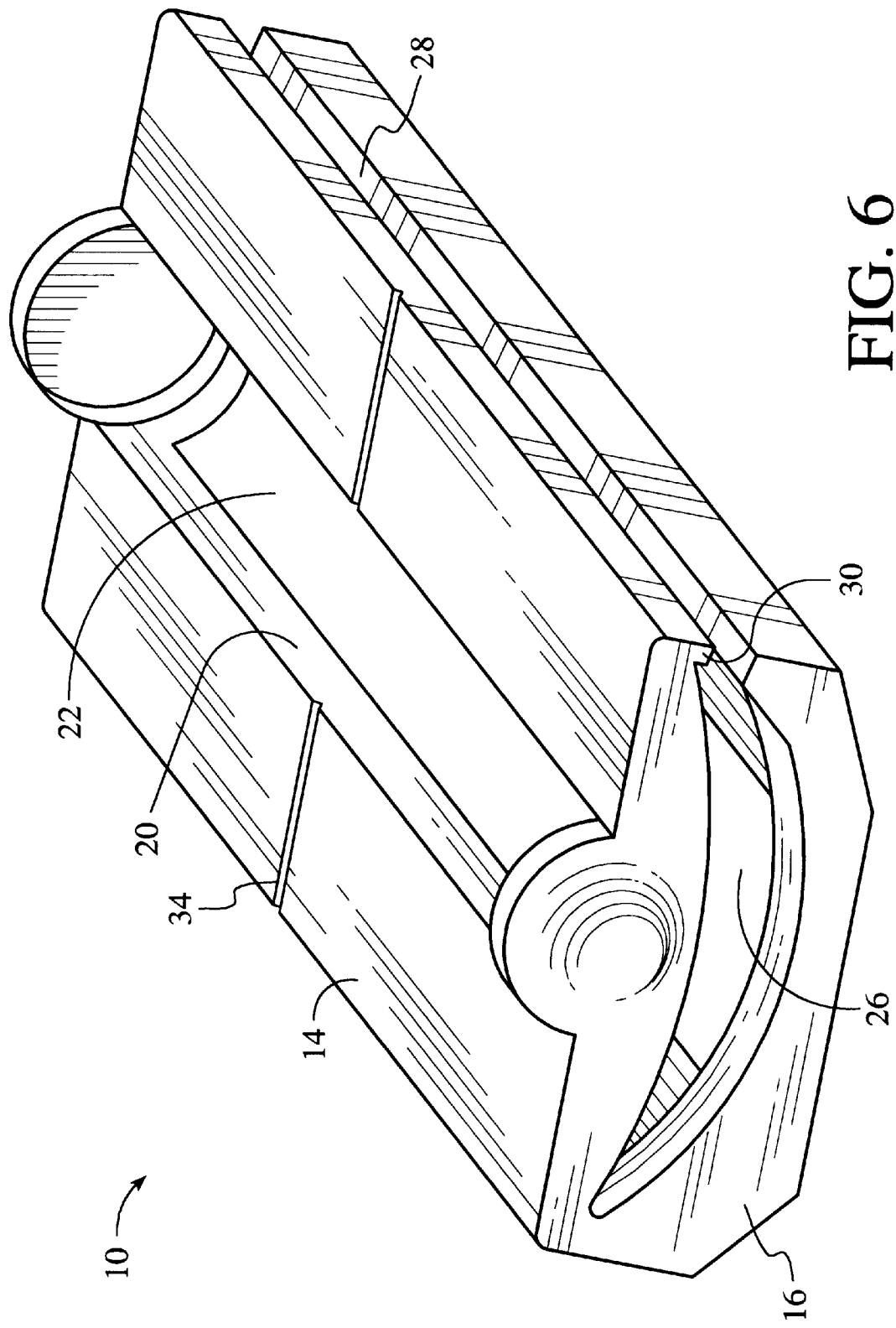
FIG. 6 is a perspective view of the housing with the level vial removed.
Figure 7:
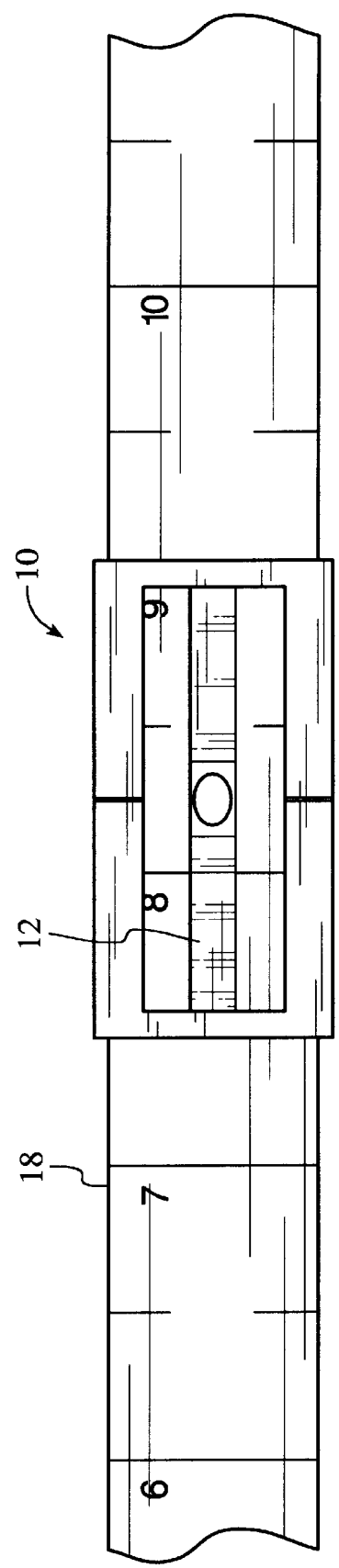
FIG. 7 is a perspective view of the tape blade level of the present invention installed on a tape measure blade.

Referring now to FIG. 6, the housing 14 is generally rectangular. It includes on a top surface a level vial cavity 20. The level vial cavity 20 is rounded on a bottom side to conform to the shape of the level vial 12. A central portion 22 of the bottom side of the level vial cavity 20 is open, so that the level vial 12 can be seen from the rear of the level 10. Projecting end tabs 24 that protrude above the front face of the housing 14 prevent the level vial 12 from moving end to end within the level vial cavity 20. While any of the know securing means can be used to fix the level vial 12 in the cavity 20, in the preferred embodiment, an adhesive is used.

The back side of the housing 14 forms the attaching means 16. The attaching means 16 is integral to the housing 14, and includes an arcuate blade opening 26. The arcuate opening 26 conforms in shape to a typical tape measure blade. The blade opening 26 includes an open slot 28 on a lower side of the level 10 between the front of the housing 14 and the attachment means 16. A tape measure blade 18 passes through the slot 28 and is received in the arcuate opening 26 the level 10 is mounted on the tape blade 18.

A projecting flange 30 on the inner side of the front of the housing 14 extends into the arcuate blade opening 26, partially blocking the open slot 28. The flange 30 prevents the tape blade 18 from falling out of the level 10 before the user intends to remove it. The attaching means 16 and the flange 30 are sized so that the gap in the open slot 28 is approximately 1/32" wide. With this conformation, the level 10 mounted on the tape blade 18 can be completely inverted without the level 10 falling from the tape blade 18.

The back side of the housing 14 also includes a viewing window 32 to allow the user to see the level vial 12 from the rear of the level 10. While the viewing window 32 is not to be used when the level 10 is mounted on a tape blade, it is useful when the level 10 is mounted on a string line.

Both the front and the rear surfaces of the housing 14 include a center line demarcation 34. This line makes it easier for a user to determine when the bubble of the level vial 12 is exactly centered.

It is understood that the inner surface of the top of the arcuate opening 26 must include a line that is parallel with the longitudinal axis of the level vial 12. The inner surface of the top of the arcuate opening 26 is the surface which supports the level 10 on the tape blade 18 or on a line. The inner surface of the top of the arcuate opening 26 must therefore be parallel to the longitudinal axis of the level vial 12 for the level 10 to function properly. The inner surface of the top of the arcuate opening 26 is constructed so that when a tape blade is inserted into the device, the device balances on the top edge of the tape blade, with the tape blade touching neither the front surface nor the rear surface of the arcuate opening 26.

In use, the user simply slips the level 10 onto his tape blade 18 when he has deployed his tape measure. The user can then measure and level simultaneously, while holding only one tool. As indicated above, the user can even invert the device without it falling from the tape blade 18. Similarly, if the user is using a string line, the level 10 is simply placed on the line at the desired location. The level vial 12 can then be viewed from the front as well as from the rear, through the viewing window 32.

While nearly any rigid material is suitable for construction of the housing 14 of the level 10, it is envisioned by the inventor that the housing 14 will typically be manufactured from injection molded plastics. The level 10 will typically measure approximately 1¾" long, by 1⅛" high, by ⅝" thick, including the projecting end tabs 24. However, it is understood that the level 10 can be manufactured to any dimensions desired by the user.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A tape blade level comprising:
a level vial contained in a front portion of a housing, and
attaching means adapted to attach said tape blade level to a tape measure blade or a string line; wherein
said housing includes an opening in a rear portion thereof so that said level vial is visible from said rear side.

2. The tape blade level of claim 1 wherein:
said attaching means is integral to said housing and comprises said rear portion of said housing,
said attaching means includes an arcuate blade opening that conforms in shape to the tape measure blade, said arcuate blade opening is in communication with an open slot on a bottom side of said level, said slot is formed between said front portion of said housing and said attachment means, said open slot allows the tape measure blade to pass therethrough, the tape measure blade then being received in said arcuate opening to mount said level on the tape measure blade.

3. The tape blade level of claim 2 wherein:
said attaching means is constructed such that a balance line is formed at an upper end of said arcuate blade opening so that when said tape blade is inserted into said tape blade level, said tape blade level balances on a top edge of said tape blade, said tape blade thereby touching neither a front surface nor a rear surface of said arcuate blade opening.

4. The tape blade level of claim 2 wherein:
said attaching means comprises a projecting flange on an inner side of said front portion of said housing, said flange extends into said arcuate blade opening, thereby partially blocking said open slot to prevent the tape measure blade from falling out of said level before a user intends to remove said level from the tape measure blade.

5. The tape blade level of claim 4 wherein:
said open slot is approximately ¹⁄₃₂" wide.

6. The tape blade level of claim 1 wherein:
said front portion and said rear portion of said housing each comprise a center line demarcation.

7. A tape blade level comprising:
a level vial contained in a front portion of a housing, and
attaching means adapted to attach said tape blade level to a tape measure blade or a string line; wherein
said housing includes an opening in a rear portion thereof so that said level vial is visible from said rear side, and
said attaching means is integral to said housing and comprises said rear portion of said housing,
said attaching means includes an arcuate blade opening that conforms in shape to the tape measure blade, said arcuate blade opening is in communication with an open slot on a bottom side of said level, said slot is formed between said front portion of said housing and said attachment means, said open slot allows the tape measure blade to pass therethrough, the tape measure blade then being received in said arcuate opening to mount said level on the tape measure blade.

8. The tape blade level of claim 7 wherein:
said attaching means is constructed such that a balance line is formed at an upper end of said arcuate blade opening so that when said tape blade is inserted into said tape blade level, said tape blade level balances on a top edge of said tape blade, said tape blade thereby touching neither a front surface nor a rear surface of said arcuate blade opening.

9. The tape blade level of claim 7 wherein:
said attaching means comprises a projecting flange on an inner side of said front portion of said housing, said flange extends into said arcuate blade opening, thereby partially blocking said open slot to prevent the tape measure blade from falling out of said level before a user intends to remove said level from the tape measure blade.

10. The tape blade level of claim 9 wherein:
said open slot is approximately ¹⁄₃₂" wide.

11. The tape blade level of claim 9 wherein:
said rear portion of said housing comprises a viewing window to allow a user to see said level vial from a rear side of said level.

12. The tape blade level of claim 9 wherein:
said front portion and said rear portion of said housing each comprise a center line demarcation.

13. A tape blade level comprising:
a level vial contained in a front portion of a housing, and
attaching means adapted to attach said tape blade level to a tape measure blade or a string line; wherein
said housing includes an opening in a rear portion thereof so that said level vial is visible from said rear side, and
said attaching means is integral to said housing and comprises said rear portion of said housing,
said attaching means includes an arcuate blade opening that conforms in shape to the tape measure blade, said arcuate blade opening is in communication with an open slot on a bottom side of said level, said slot is formed between said front portion of said housing and said attachment means, said open slot allows the tape measure blade to pass therethrough, the tape measure blade then being received in said arcuate opening to mount said level on the tape measure blade, said attaching means further comprises a projecting flange on an inner side of said front portion of said housing, said flange extends into said arcuate blade opening, thereby partially blocking said open slot to prevent the tape measure blade from falling out of said level before a user intends to remove said level from the tape measure blade.

14. The tape blade level of claim 13 wherein:

said attaching means is constructed such that a balance line is formed at an upper end of said arcuate blade opening so that when said tape blade is inserted into said tape blade level, said tape blade level balances on a top edge of said tape blade, said tape blade thereby touching neither a front surface nor a rear surface of said arcuate blade opening.

15. The tape blade level of claim 13 wherein:

said open slot is approximately 1/32" wide.

16. The tape blade level of claim 13 wherein:

said rear portion of said housing comprises a viewing window to allow a user to see said level vial from a rear side of said level.

17. The tape blade level of claim 13 wherein:

said front portion and said rear portion of said housing each comprise a center line demarcation.

* * * * *